US008301750B2

(12) United States Patent
Lacombe et al.

(10) Patent No.: US 8,301,750 B2
(45) Date of Patent: Oct. 30, 2012

(54) APPARATUS, SYSTEM, AND METHOD FOR FACILITATING COMMUNICATION BETWEEN AN ENTERPRISE INFORMATION SYSTEM AND A CLIENT

(75) Inventors: Jason Nathaniel Lacombe, San Francisco, CA (US); Travis Eli Nelson, Campbell, CA (US); Suraksha Vidyarthi, Newark, CA (US)

(73) Assignee: International Business Machines Corporation, Armonk, NY (US)

( * ) Notice: Subject to any disclaimer, the term of this patent is extended or adjusted under 35 U.S.C. 154(b) by 1580 days.

(21) Appl. No.: 11/149,652

(22) Filed: Jun. 10, 2005

(65) Prior Publication Data

US 2006/0282524 A1    Dec. 14, 2006

(51) Int. Cl.
*G06F 15/173* (2006.01)
*G06F 11/00* (2006.01)

(52) U.S. Cl. ............................ 709/224; 709/223; 714/16

(58) Field of Classification Search .................. 709/206, 709/223–224; 719/318; 714/2, 16
See application file for complete search history.

(56) References Cited

U.S. PATENT DOCUMENTS

| 5,283,856 A * | 2/1994 | Gross et al. ........................ 706/47 |
| 5,465,328 A * | 11/1995 | Dievendorff et al. ............ 714/15 |
| 5,850,517 A * | 12/1998 | Verkler et al. .................. 709/202 |
| 5,870,605 A * | 2/1999 | Bracho et al. ................... 719/318 |
| 5,951,648 A * | 9/1999 | Kailash ........................... 709/237 |
| 6,125,363 A * | 9/2000 | Buzzeo et al. ................... 707/100 |
| 6,260,077 B1 | 7/2001 | Rangarajan et al. ............ 719/328 |
| 6,279,046 B1 * | 8/2001 | Armstrong et al. ............... 710/5 |
| 6,397,352 B1 * | 5/2002 | Chandrasekaran et al. ..... 714/16 |
| 6,704,801 B1 * | 3/2004 | Minyard .......................... 719/314 |
| 6,829,770 B1 | 12/2004 | Hinson et al. .................. 719/328 |
| 6,877,051 B2 * | 4/2005 | Iwanojko et al. ............. 710/100 |
| 2002/0026487 A1 * | 2/2002 | Ogilvie et al. ................. 709/206 |
| 2002/0091824 A1 | 7/2002 | Anderson et al. ............. 709/225 |
| 2002/0129141 A1 * | 9/2002 | Sogabe et al. .................. 709/224 |
| 2004/0193653 A1 * | 9/2004 | Howard et al. ................ 707/200 |
| 2004/0205770 A1 * | 10/2004 | Zhang et al. ................... 719/313 |
| 2005/0038791 A1 * | 2/2005 | Ven ................................ 707/100 |

(Continued)

FOREIGN PATENT DOCUMENTS

EP         0759591 A1     2/1997

(Continued)

OTHER PUBLICATIONS

The Open Group. "Distributed Transaction Processing: The XA Specification." [Retrieved from the internet] © Dec. 1991. [Retrieved online on Jun. 28, 2010] <URL: http://www.opengroup.org/onlinepubs/009680699/toc.pdf>.*

(Continued)

*Primary Examiner* — Joseph Avellino
*Assistant Examiner* — James Baron
(74) *Attorney, Agent, or Firm* — Kunzler Law Group, PC (57) ABSTRACT

An apparatus, system, and method are disclosed for assuring delivery of an Enterprise Information System (EIS) event to a client. An adapter apparatus polls at least one EIS for an event. The event is staged to a staging table, consisting of an XA-compliant database, in preparation for delivery to the client. The status of the event is marked and the event is delivered to the client. Events delivered to clients that are unresponsive or otherwise unavailable are held until the clients become responsive and then the events are delivered. Delivery of events is confirmed using a transaction service.

34 Claims, 8 Drawing Sheets

U.S. PATENT DOCUMENTS

| | | | |
|---|---|---|---|
| 2005/0049945 A1* | 3/2005 | Bourbonnais et al. | 705/30 |
| 2005/0198643 A1* | 9/2005 | Lachelt et al. | 718/106 |
| 2007/0088970 A1* | 4/2007 | Buxton et al. | 714/2 |

FOREIGN PATENT DOCUMENTS

| | | | |
|---|---|---|---|
| JP | 2000276394 A | | 10/2000 |
| JP | 2002026070 | | 1/2002 |
| JP | 2002026070 A * | | 1/2002 |
| JP | 2002026979 | | 1/2002 |
| JP | 2002082862 A | | 3/2002 |
| JP | 2001086298 | | 3/2011 |
| WO | WO 98/39868 A2 | | 9/1998 |
| WO | WO 03/094014 A1 | | 11/2003 |

OTHER PUBLICATIONS

Woolf, Bobby. "Configuring and using XA distributed transactions in WebSphere Studio." Jun. 2004. Subbmitted by the Applicant on Jun. 10, 2005.*

Woolf, Bobby. Configuring and Using XA Distributed Transactions in Websphere Studio http://www-106.ibm.com/developerworks/websphere/library/techarticles/0047_woolf/0047_woolf.html Jun. 2004.

Tanenbaum et al., "Reliability Issues in Distributed Operating Systems," Proceedings of the Syposium on Reliability in Distributed Software and Database Systems. Williamsburg, VA., Mar. 17-19, 1987, Washington, IEEE Comp. Soc. Press, US, vol. SYMP. 6, Mar. 17, 1987.

Chang et al., "Reliable Broadcast Protocols," ACM Transactions of Computer Systems, New York, NY, US, vol. 2, No. 3, Aug. 1984, pp. 251-273.

"Event Channel Service which Provides both the Push Model and the Pull Model" IBM Technical Disclosure Bulletin, IBM Corp. New York, US vol. 40, No. 11, Nov. 1997 the whole document.

* cited by examiner

APPARATUS, SYSTEM, AND METHOD FOR FACILITATING COMMUNICATION BETWEEN AN ENTERPRISE INFORMATION SYSTEM AND A CLIENT

BACKGROUND OF THE INVENTION

1. Field of the Invention

This invention relates to an apparatus, system, and method for facilitating communication between an Enterprise Information System (EIS) and a client, and more particularly relates to an apparatus, system, and method for assuring delivery of EIS events to multiple clients.

2. Description of the Related Art

In today's business world vast amounts of information are generated. This information is vital to the success of a business and may be a business' most valued commodity. Information must be processed, stored, updated, and shared by the business' operational units. For example, a manufacturer must be able to share information with its sales offices, its support staff, its suppliers, its distributors, and various other entities. As a result, many businesses utilize an information storage system that may be centrally located and that everyone associated with the business can access. One such information system is an Enterprise Information System (EIS). A business may have several sub-entities or "clients" that access one or more EISs.

Software containing processing logic is often utilized to manage the communication between an EIS and a client system. This software or code generally resides in an adapter and helps build connectivity between EISs. The adapter enables bi-directional communication with an EIS. It allows clients to perform operations inside the EIS such as querying or modifying data. These operations are sometimes referred to as an outbound communication. The adapter may also enable a client to receive data from, or be made aware of changes in, the EIS. Information flowing in this direction is often referred to as inbound communication.

Inbound communications typically contain information about business data that has been created or changed inside the EIS. The creation, modification, update, or deletion of information within an EIS is referred to as an EIS event. It is often important to a business that all of its sub-entities or clients receive the same EIS event. Businesses do not want their divisions operating with inconsistent sets of data. Businesses want their data synchronized between their client systems. Businesses also do not want multiple copies of an EIS event sent to their client systems to preserve data integrity. Multiple copies of data can cause confusion and a lack of confidence in the data. Furthermore, excess data takes up space, which is often at a premium.

One problem with most adapters is that they don't assure delivery of events to the clients. For example, in publisher/subscriber systems, such as a message-based system, information is provided by a publisher, and subscribers have access to that information. However, if the subscriber client is off-line, or otherwise unresponsive, the client subscriber misses the update. Most publisher programs do not have the capability to provide the missed information to the unresponsive client at a later time. Most publisher programs do not even know that a subscriber has missed the update.

Another problem with some adapters is that they do not ensure that clients receive one and only one copy of a given event. These adapters are programmed to broadcast or transfer certain data at certain times and do not consider whether the client or end unit has already received the event. Yet another problem with many adapters is that they do not consider the status of any individual client while transmitting events to multiple clients. Thus, a client in a multiple client system is more likely to get out of sync with the other clients, as far as data transfer is concerned.

Another problem with many adapters is that they do not have recovery protocols to keep an event from becoming lost if there is an unexpected problem while processing the event. Yet another problem with many current adapters is that they cannot add or remove clients dynamically. Once a client becomes unresponsive, goes offline or otherwise become unavailable, some adapters can no longer send events to those clients.

From the foregoing discussion, it should be apparent that it would be an advancement in the art to provide an apparatus, system, and method for facilitating communication between an EIS and one or more clients that would assure delivery of EIS events to clients. It would be a further advancement in the art to provide such an apparatus, system and method that would send an event only once to each client. It would be further advancement in the art to provide such an apparatus, system, and method that would keep track of events even after one or more clients have become available. Such an apparatus, system, and method are disclosed and claimed herein.

SUMMARY OF THE INVENTION

The present invention has been developed in response to the present state of the art, and in particular, in response to the problems and needs in the art that have not yet been fully solved by currently available apparatuses, systems, and methods for communicating between an Enterprise Information System (EIS) and clients. Accordingly, the present invention has been developed to provide such an apparatus, system, and method that overcome many or all of the above-discussed shortcomings in the art.

The apparatus to facilitate communication between an EIS and one or clients may be provided with a logic unit containing a plurality of modules configured to functionally execute the necessary steps of polling the EIS for an event, staging the event in preparation for delivering the event to a client, delivering the event, and confirming whether or not the event was delivered. These modules in the described embodiments include a polling module, a staging module, a delivery module, and a confirmation module.

The apparatus, in one embodiment, also includes a removal module to facilitate removal of the event from the EIS once the event has been delivered to the client. The apparatus is further configured to hold events for clients designated as durable subscribers that have become unavailable to receive an EIS event. In one embodiment, the apparatus is configured to redeliver held events once an unavailable client becomes available again.

The apparatus may use a transaction service to deliver events to one or more clients and to confirm whether those events were delivered. In one embodiment, the transaction service delivers an event as part of a distributed transaction that is XA-compliant.

The apparatus may also be embodied in a system that includes the EIS, one or more clients, and a data source to facilitate staging the event and preparing the events for delivery. In one embodiment, the data source is an XA-compliant database. The system may also include a XA transaction manager to facilitate the use by the apparatus of the transaction service. In one embodiment, a client may include one or more subsystems, computing devices, or endpoints. The client may be directly connected to the apparatus and the EIS event may be delivered first to the client and then passed along to the client's subsystems. For purposes of this disclosure, a client and its subsystems, computing devices, endpoints, or other "down-line" devices are individually and collectively referred to as "client" or "clients."

A method of the present invention is presented for facilitating communication between an EIS and one or more clients. The method in the disclosed embodiments substantially include the steps necessary to carry out the functions presented above with respect to the operation of the described apparatus and system. In one embodiment, the method includes polling the EIS for an event, staging the event in preparation for delivering it to a client, delivering the event, and confirming whether or not the event was delivered. The method steps disclosed herein may also be embodied as operations carried out by the computer-readable code of a computer program product.

A method is also disclosed for integrating an EIS with one or more client systems for a customer. The method may include the steps of receiving a set of integration requirements, building an integration adapter configured to connect an EIS and plurality of software clients, delivering the integration adapter to the customer, and setting up the integration adapter. In one embodiment, the integration adapter is the apparatus discussed above. Setting up the integration adapter may include registering each client to receive events from the EIS. Setting up an adapter may also include determining the frequency of polling the EIS for an event and the quantity of events to stage before delivery.

A method is also disclosed for deploying a computing infrastructure configured to integrate an Enterprise Information System (EIS) with a plurality of software clients that assures once-and-only-once event delivery to the clients. In one embodiment, the method includes developing a software toolkit with a plurality of extendable modules, integrating a transaction service with the software tool kit, and publishing the software tool kit. The extendable modules may include those of the apparatus described above. In one embodiment, the modules are configured to poll at least one EIS for an event, stage the event for delivery to at least one client, deliver the event to the at least one client, and confirm that only one instance of the event was delivered to each of client.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
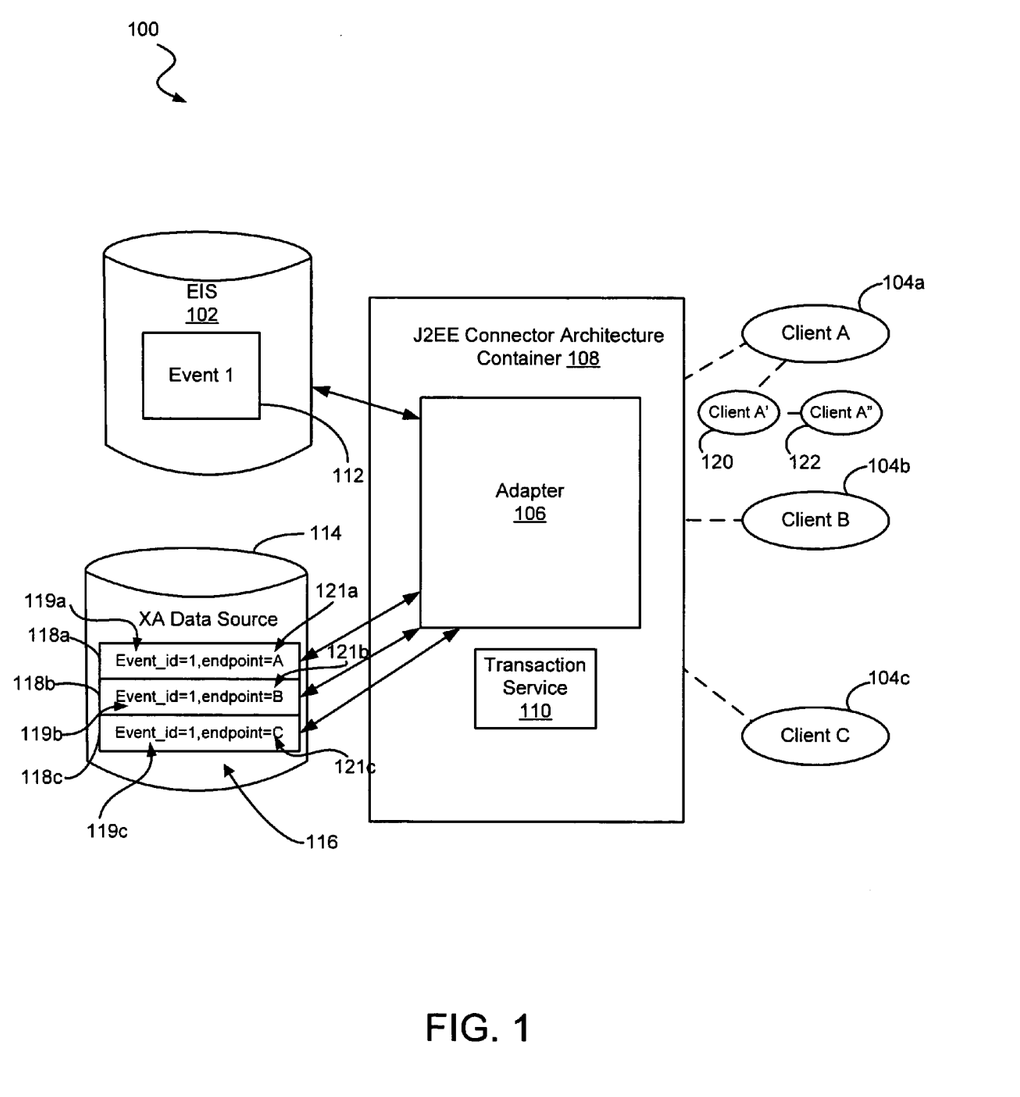
FIG. 1 is a schematic block diagram illustrating one embodiment of a system for facilitating communication between an Enterprise Information System (EIS) and a client in accordance with the present invention.

FIG. 1 depicts a system 100 according to the present invention. The system 100 includes an Enterprise Information System (EIS) 102 and one or more clients 104. An apparatus or adapter 106 is in communication with the EIS 102 and the clients 104 to facilitate the transmission of information between the EIS 102 and the clients 104.

The adapter 106 may operate within a J2EE connector architecture container 108 that includes a transaction service 110. The J2EE connector architecture allows the adapter 106 to interact with the EIS 102. In one embodiment, the J2EE connector architecture defines an interface that governs the relationship between the EIS 102 and the adapter 106. This interface determines the interaction between the adapter 106 and the EIS 102 as it relates to the management of connections, transactions, and security.

The EIS 102 may be a mainframe transaction processing system, an Enterprise Resource Planning system, legacy non-Java applications, and the like. In one embodiment, the EIS 102 is a database management system. The EIS 102 is configured to interface with the adapter 106. In one embodiment, the interface is written in Java code to allow the interface to communicate with the J2EE connector architecture container 108.

When a change occurs in the EIS 102, the adapter 106 broadcasts or communicates that change to each client 104. Such a change is referred to herein as an event It will be appreciated by those of skill in the art that the broadcasting of an event 112 to 104 is sometimes called an inbound event. An event 112 may be any information contained in the EIS, including with out limitation, a data change, error message, a timestamp change, a location change, an update, and the like. In one embodiment, where the EIS is a database, the event 112 may be a database change, a table row change, a customer address change and the like. In another embodiment, an event 112 may be a customer address change, a customer ID change. The event 112 may be any kind of information that needs to be communicated between the EIS 102 and a client 104. The event 112 may be located in a persistent store within the EIS.

In one embodiment, the event 112 is structured and is ready to be used by the client. For purposes of this disclosure, the use of the event 112 by the client 104 in any manner may be referred to as the consumption of the event. As discussed above, the ultimate consumption of an event 112 may be by a client or its subsystems, computing devices, endpoints, or other "down-line" devices.

The adapter 106 is also in communication with an XA data source 114. The adapter 106 may employ a staging table 116 within the XA data source 114. In one embodiment, the staging table 116 is a database that is XA-compliant and can communicate with the transaction service 110. In one embodiment, the staging table 116 is a table within off-the-shelf third-party database management software.

When an event 112 is detected in the EIS 102, the adapter 10 6 writes a reference 118 to the event 112 to the staging table 116 for each available client 104. For purposes of this disclosure, a client is "available" if the client is responsive, online, active, listening, and otherwise functioning properly to received events. The reference 118 includes an event identification 119 and an endpoint identification 121. The event ids 119a-c within the references 118a-c may be the same in each reference 118 to a single event 112. The client ids 121a-c, however, are specific to each client, or client endpoint. As discussed above, a client resource may have additional resources, sub clients, sub systems, and the like. Each reference 118 includes a specific endpoint identification. While each client may have subsystems that also will need the event 112, only the primary client (or endpoint) 104a is referenced in the staging table 116. If the client 104a contains such subsystems 120,122; the client 104a is responsible for routing the event to those subsystems.

It will be appreciated by those of skill in the art the other identifying features for the event 112 could be part of the reference 118. For example a portion or all of the event could be stored as a reference 118 in the staging table 116. In addition, references 118 may include a timestamp or other information.

Each event 112 in the staging table 116 is then delivered to its corresponding listening client 104 by means of the transaction service 110. In one embodiment, the adapter 106 delivers the event 112 to the corresponding client 104 as part of a unique transaction controlled by a J2EE application server, enlisting the transaction service 110. Each client 104a, 104b, and 104c or client line receives its own transaction.

The transaction produced by the transaction service 110 is a series of actions performed as a single logical unit of work in which either all of the actions are performed or none of them. It will be appreciated by those of skill in the art that these transactions are also called "local" or "simple" transactions. In one embodiment, the transaction is an atomic operation. It will be appreciated by those of skill in the art that atomic operations are operations that take place in one step and cannot be interrupted. The transaction is also consistent, isolated, and durable. Changes made within the client 104 during a transaction are tentative. To make the changes permanent, a transaction ends with a "commit" operation that finalizes the changes.

If any of the changes cannot be committed, the transaction will "roll back," undoing all of the changes as if the transaction never took place. If code within any one client 104 performing the actions decides not to commit or cannot commit successfully, then the client 104 must roll back the transaction to undo the actions for that particular client 104. If an application crashes in the middle of a transaction, when it restarts, a transaction recovery process will roll back the open transaction. In a write transaction, all changes must either all commit or all roll back. In a read transaction, there are no changes to commit, but the transaction prevents the data being read from changing until all of the reads are complete.

In one embodiment, the transaction service 110 delivers the event 112 as part of a distributed transaction. A distributed transaction takes into consideration the subsystems or "down-line" systems of each individual client 104. For example, client 104a may have two or more independent transactional resources Client A' 120 and Client A" 122. These may include, for example, two separate databases. For the transaction to commit successfully, all of the individual resources 120, 122 of a particular client 104a must commit successfully. If the delivery of an event 112 to any of the down-line systems Client A' 120, Client A" 122 of client 104a are unsuccessful, the transaction must roll back in all of the resources Client A' 120, Client A" 122.

In one embodiment, the transaction service 110 utilizes a "two-phase commit" to deliver an event 112 to a client 104. A two-phase commit is a method for committing a distributed transaction in two steps. In the first step, each of the resources 104, 120, and 122 votes on whether it is ready to commit. For example, for the resources associated with client a 104a, the group of client A 102, client A' 120, and client A" 122 decides if they are ready to commit. In step two, if all of the resources 102, 120, and 122 are ready, they all commit at once. After the group commits, the corresponding reference 118a is deleted from the staging table 116 and delivery of the event 112 to client 102a can no longer roll back. It will be appreciated by those of skill in the art that a two-phase commit ensures that a distributed transaction can always be committed or always rolled back, even if parts of the system crash while the transaction is being committed. Because each client 104a, 104b, and 104c receives its own transaction, if the transaction service 110 determined that client A' 120 did not receive the event 112, the roll back of the event 112 delivery within the staging table 116 does not affect the delivery of the event 112 to Client B 104b and Client C 104c. Thus, Clients B and C, 104b, 104c can utilize or consume the event 112 even when a crash occurred within the Client A line.

In one embodiment, the transaction service 110 delivers events 112 to clients 104 in transactions that meet the XA specification. The XA specification is available from distributed transaction processing (DTP) defined by the Open Group and is incorporated herein by reference.

In one embodiment, the XA specification defines how the adapter 106 uses the transaction service 110 to coordinate a distributed transaction across multiple resources 104, 120, and 122. In one embodiment, the adapter 106 facilitates the delivery of events 112 between the EIS 102 and one or more clients 104 using an XA distributed transaction.

Figure 2:
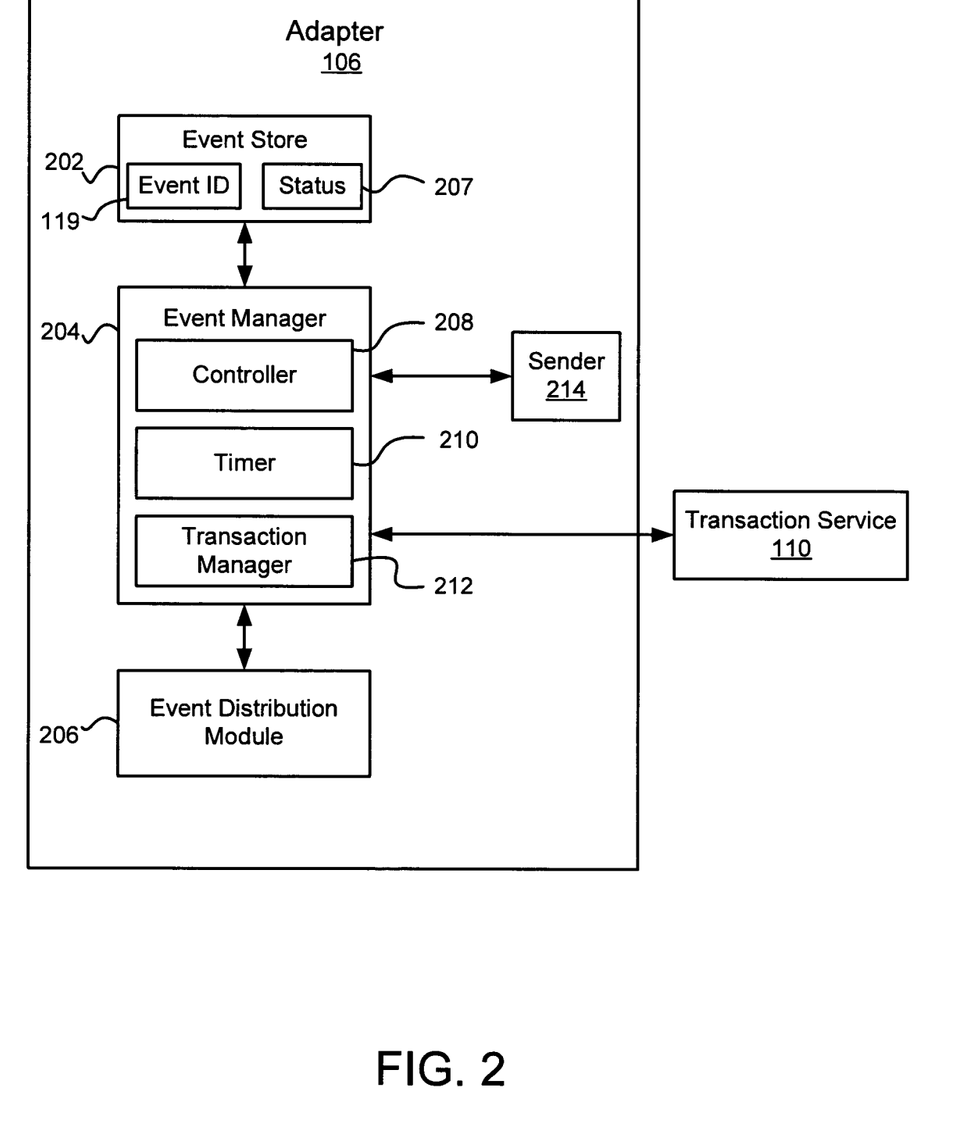
FIG. 2 is a schematic block diagram illustrating one embodiment of an adapter that may be used in the system of FIG. 1.

Referring now to FIG. 2, an apparatus or adapter 106 according to the present invention is illustrated. The adapter 106 includes an event store 202, an event manager 204 and an event distribution module 206. The event manager 204 may include a controller 208 for executing control of the event manager 204. The event manager 204 may also include a timer 210 to facilitate polling the EIS 102 for events 112 at regular intervals. The event manager 204 may also include a transaction manager 212 to interface with the transaction service 110.

The event store 202 functions as an interface between the adapter 106 and the EIS 102. Events 112 occurring in the EIS 102 may be recorded in the event store 202. In one embodiment, a record of the detected event 112 is stored in the event store 202. Details of the event 112 may remain in the EIS 102. The adapter 106 periodically polls the event store 202 and uses the information therein to build an event reflecting the changed data to be delivered to interested clients 104. In one embodiment, the event store 202 is represented by Java code that the adapter 106 uses to implement to interact with the EIS 102. The event store 202 may comprise data structures within the EIS 102 and processing logic within the adapter 106. The event store 202 is configured to carry out generic tasks or commands such as, "produce all the events." The event store 202 translates such commands to one or more EIS commands to actually carry out the command within the EIS 102. Accordingly, the event manager 204 does not need to be customized to any given EIS 102.

In one embodiment, the event store 202 contains information for each event 112 received from the EIS 102. The event store 202 may contain an event 112 identification or "event ID." The event ID 119 may be considered a key that allows the event manager 204 through the event store 202 to access any given event 112. In one embodiment, the event ID 119 is unique to each event 112. The event store 202 may also contain a key for the EIS object that the event 112 occurred on or the entire event 112 itself. The event store 202 may also contain the type of object that the event occurred on. In one embodiment, the event store 202 contains a delivery status 207 for each event 112. In one embodiment, the status 207 is a constant and includes one of the following flags:

NEW_EVENT
IN_PROGRESS
ERROR

It will be appreciated by those of skill in the art that the status 207 can include any number of items or designations that describe a current condition of each event 112.

The event distribution module 206 is an interface to the XA data source 114. The event distribution module 206 allows the event manager 204 to access the XA data source 114. In one embodiment, the event distribution module 206 is a database or a database table. It will be appreciated by those of skill in the art that the event distribution module 206 can be any data structure, code, or module that allows the event manager 204 to interact with the staging table 116, including an XML file or flat file, regardless of the configuration of the staging table 116. In one embodiment, the event distribution module 206 contains a client identification 121 and an event identification 119.

The event manager 204 manages the tasks of detecting an event 112 through the event store 202, writing or staging the event 112 to the staging table 114 through the event distribution module 206, and delivering the event 112 to one or more clients 104.

The sender 214 may comprise part of the event manager 204. In one embodiment, the event manager 204 creates a sender 214 for every client 104 to which events 112 will be delivered. The event manager 204, through the sender 214, is responsible for sending each individual event 112 to multiple clients 104. The sender 214 provides forking capabilities for communicating with multiple clients 104.

Figure 3:
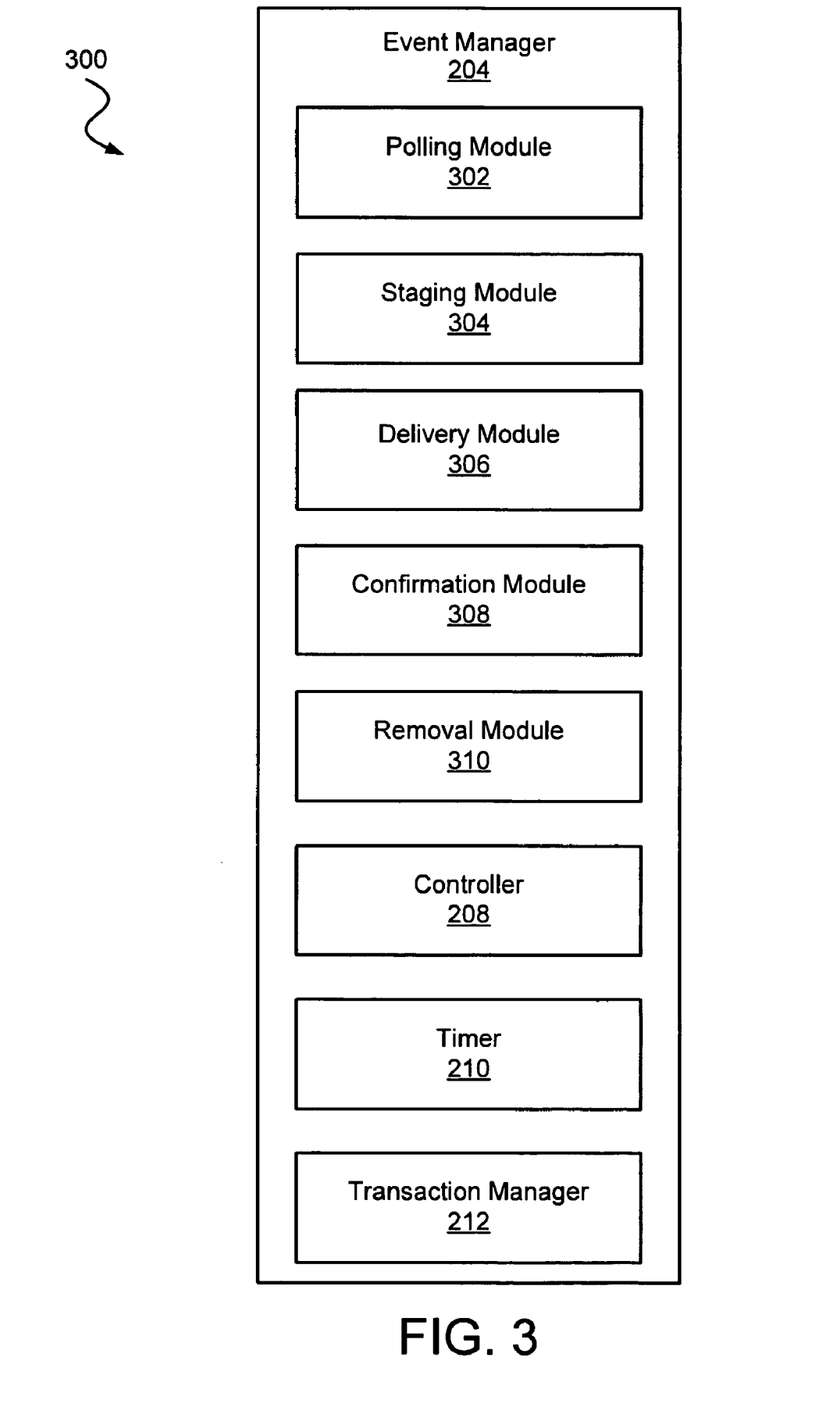
FIG. 3 is a schematic block diagram illustrating one embodiment of an event manager that may be used in the adapter of FIG. 2.

FIG. 3 illustrates an apparatus 300 embodied as the event manager 204 within the adapter 106. The apparatus 300 may also alternatively be embodied as the adapter 106 itself. The apparatus 300 includes a polling module 302 configured to poll at least one EIS 102 for an event 112. The apparatus 300 also includes a staging module 304 configured to stage the event 112 for delivery to at least one client 104. The apparatus 300 includes a delivery module 306 configured to deliver the event 112 to the at least one client 104. The apparatus 300 may also include a confirmation module 308 configured to confirm that only one instance of the event 112 is delivered to each of the at least one client 104. In one embodiment, the apparatus 300 includes a removal module 310 to facilitate removal of consumed events 112 from the EIS 102.

The polling module 302 is configured to periodically query the EIS 102 for events 112 to be delivered to a client 104. The polling module 302 may allow polling based on a user-configured parameter. In one embodiment the parameter is the rate or frequency with which the polling module 302 polls the EIS 102 for an event 112. The parameter may also include the quantity of events 112 to stage before delivering the events 112 to one or more clients 104. In one embodiment, the polling module 302 looks for designated triggers that alert the polling module 302 that an event 112 has occurred within the EIS 102. Alternatively, the presence of records in the event store 202 may signal that events 112 have occurred. The polling module 302 may also determine if events 112 that have been held, are ready to be released because, a client 104 may have been unavailable earlier to receive them. The polling module 302 may also determine if new clients are available to receive events 112. In one embodiment, the event manager 204 registers new clients to receive events. The polling module 302 is configured to perform the polling steps and operations discussed in greater detail below in connection with FIGS. 4-6.

The staging module 304 is configured stage the event 112 for delivery to at least one client 104. The staging module 304 may write a reference 118 to the event 112 to a staging table 116 for each of the at least one clients registered to receive events. The staging module 304 may also adjust a delivery status 207 for each event 112. Once a reference 118 is added to the staging table 116 and the status set, the event 112 is staged.

The delivery module 306 is configured to deliver events 112 to one or more clients 104. As stated above, the term "client" includes all of the sub components, intermediate components or endpoints of the client. In one embodiment, the delivery module 306 works in connection with a J2EE application server. The delivery module 306 preferably transmits and stores the event 112 at the client 104 using a transaction service 110. When events 112 are rolled back, the delivery module 306 may facilitate the temporary holding of events 112 for clients 104 that are unavailable.

As will be discussed in greater detail below, clients 104 are initially registered to receive events 112 and certain clients 104 can be designated as durable subscribers upon registration. This is one user-configurable feature of the present invention. A durable subscriber client is one that requests that missed events be held and delivered to the client 104 later when the client is again available.

In one embodiment, the delivery module 306 is configured to deliver or send events 112 to clients 104 designated as durable subscribers. The delivery module 306 may deliver one or more held events 112 to a client 104 that becomes available after a period of unavailability, in response to an indicator received during polling by the polling module 302 that a client 104 has become available. This redelivery of held events 112 by the delivery module 306 is part of a crash recovery feature of the apparatus 204, 300.

A confirmation module 308 is configured to confirm that only one instance of the event 112 is delivered to each of the clients 104. The confirmation module 308 may also confirm whether or not an event 112 was delivered to a client 104. The confirmation module 308 confirms event delivery using a transaction service 110. In one embodiment, the confirmation module 308 uses an XA distributed transaction to confirm event delivery.

A removal module 310 is configured to remove the reference 118 to a staged event 112 from the staging table 116, upon confirmation of completed delivery of the event 112 corresponding to the reference 118 to a client 104. For example, when an event 112 is delivered and consumed by Client B 104b, reference 118b is removed from the staging table 116. The removal of the event reference and the consumption of the event is accomplished in an atomic operation.

In one embodiment, apparatus 300 is configured to deliver events 112 to the client 104 in the order in which they are created in the EIS 102. Accordingly, the reference 118 may include an order indicator. In another embodiment, the apparatus 300 delivers events more quickly when the order of events 112 is unimportant to one or more clients 104. The event manager 204 may use multiple execution threads for those clients 104 not concerned with order to deliver all events 112 for a given client 104 in parallel. Furthermore, the staging table 116 can store individual reference records 118 for each client 104. Thus, the event manager 204 or apparatus 300 can service each client's 104 unique needs. For example, the event manager 204 or apparatus 300 can provide sequential event delivery to one client while providing another client with unsequenced events in parallel.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
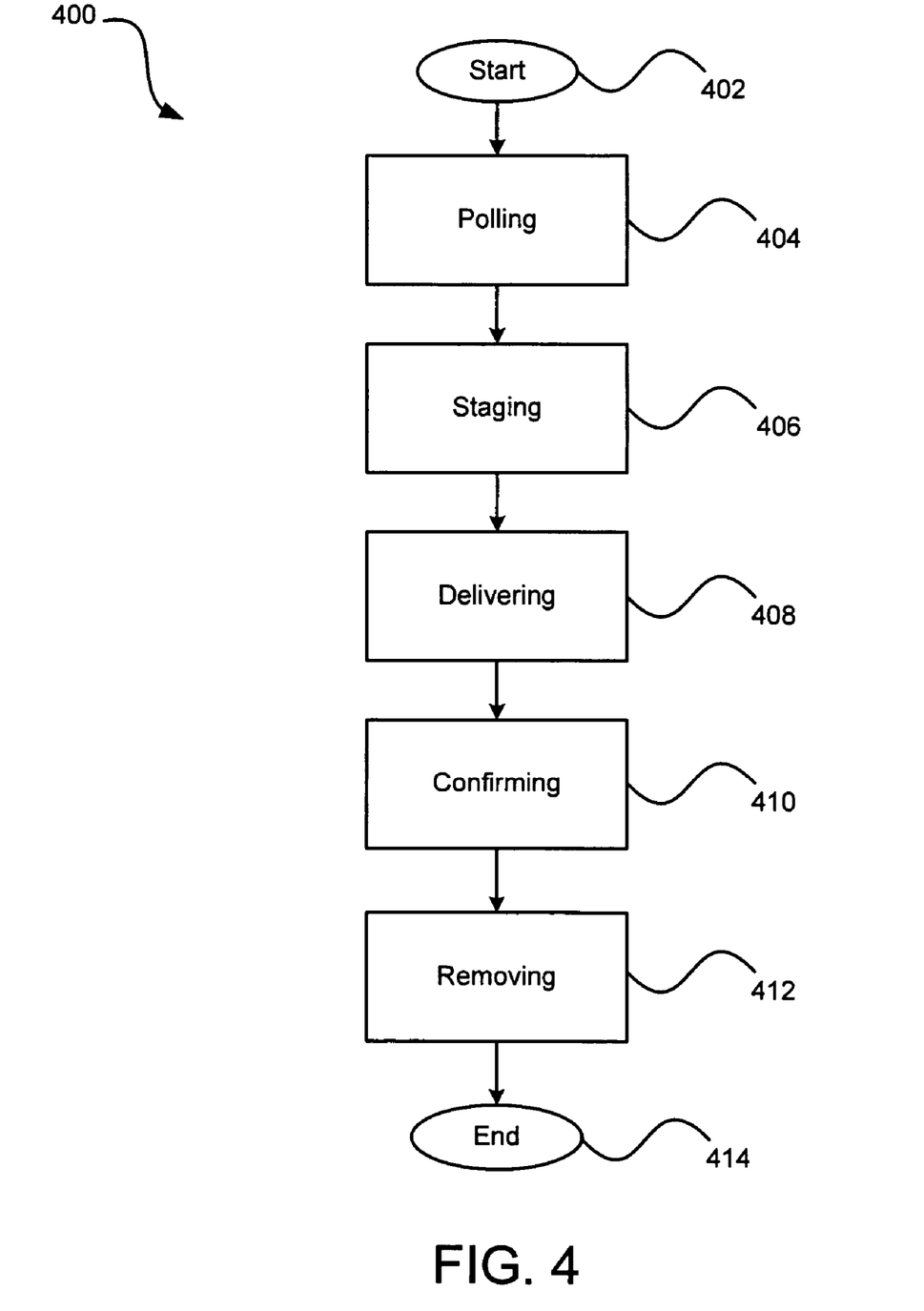
FIG. 4 is a schematic flow chart diagram illustrating one embodiment of a method for facilitating communication between an EIS and a client in accordance with the present invention.

FIG. 4 illustrates a method 400 to facilitate communication between an EIS 102 and a client 104 according to the present invention. The method starts 402 and polls 404 at least one EIS 102 for an event 112. When events 112 are found, they are staged 406 and delivered 408 to at least one client. Delivery 408 of the event is confirmed 410 and the event is removed 412 from the EIS. The method ends 414.

At the start 402 of the method or process, one or more clients 104 may be registered to receive events. In one embodiment the adapter apparatus 204, 300 communicates with one or more EISs 102 and one or more clients 104. In one embodiment, polling 404 an EIS 102 includes determining whether clients 104 are available, whether new events 112 exist, and whether held events 112are ready to be delivered. When a client 104 registers to receive an event 112, the client 104 becomes available. Sometimes a client 104 will become unavailable for any number of reasons, including without limitation, the client system crashes, the client system is busy, the client system is offline, or the client system is simply not responding. Polling 404 includes determining 404 whether a client 104 that was previously registered but unavailable, has become available.

Polling 404 the EIS 102 comprises periodically querying the EIS 102 for new events 112. The frequency with which the EIS 102 is polled 404 may be determined by a user or adapter administrator. The user or adapter administrator may also determine the quantity of events to be retrieved before starting to delivery those events. It will be appreciated by those of skill in the art that many aspects of polling 404 the EIS could be user-configurable.

In one embodiment, events may be detected using a trigger mechanism or logic residing in the EIS 102 captures events as they occur and stores them in an event store 202. In this embodiment, the polling 404 described above also applies to polling 404 the event store 202.

The adapter 204, 300 stages 406 the polled event 112 for delivery 408 to at least one client 104. Staging 406 includes writing a reference 118 to the event 112 to the staging table 116. An entry is written for each client 104 registered to receive the event 112. The staging table 116 is a database within a XA data source 114. The database stores fields that identify at least the event 112 and the client 104 to which the event 112 will be delivered.

In one embodiment, staging 406 includes marking a delivery status for each event 112 within the EIS 102 an event store 202. The delivery statuses 207 may indicate the presence of a new event 112, that an event delivery is in progress, that an error has occurred, and the like. The events 112 may be stored in the event distribution module 206 for use later during the method 400. An event 112 may be given a "NEW_EVENT" status when it first becomes detected, but before it has been delivered. The sequence of new events may be marked such that if required, the events can be delivered in the order in which they occurred. Alternatively, records in the event distribution module 206 may be delivered in a first-in-first out order. When an event 112 starts being delivered, the delivery status may be changed to "IN_PROGRESS." The "ERROR" status is attached to events 112 for which an error may have occurred during the construction of the object to be sent to the adapter 102, making the event delivery invalid. The "error" status, in one embodiment, is triggered by something other than an occurrence that causes a roll back event under the XA transaction service.

The event 112 is delivered 408 to at least one client 104. In one embodiment, the apparatus 204, 300 delivers the event 112 using an XA transaction service 110. Delivering 408 an event 112 may include transmitting and storing the event 112 using a transaction service 110 controlled by a J2EE application server. The transaction service 110 sends each event in an XA-compliant distributed transaction. Each event 112 is delivered to a specific client 104 as part of a single XA transaction. If the transaction fails to reach its endpoint, whether it be a client 104, or a clients down-line systems, the event rolls back to the staging table 116 under the XA transaction protocol used by the transaction service 110.

If a client 112 is unavailable, and that client 112 has been designated as a durable subscriber, the event is retained within the event distribution module 206. Clients 104 that are durable subscribers will not lose events 112 even if they are unavailable at the time the event 112 was originally sent to them. The event 112 is delivered or sent to the durable subscription client when that client becomes available. This delivery or re-delivery may occur in response to an indicator from the polling module or generated during the polling step 404 that a client 104 has become available.

The delivery 408 of events may include determining the delivery status 207 for that event 112. The adapter 204, 300 is robust enough to assure delivery even if a crash occurs at any point. In one embodiment, the delivery status value 207 of any pending events 112 in the event store 202 combined with the information in the event distribution module 206 determines whether events 112 need to be re-delivered. In one embodiment, the delivery or deletion of an event 112 may be determined based upon the following logic table:

| Status in Event Store | Is the event in Staging Table | Is there a durable subscription? | ACTION |
| --- | --- | --- | --- |
| NEW_EVENT | NO | YES/NO | DELIVER |
| NEW_EVENT | YES | NO | DELETE |
| NEW_EVENT | YES | YES | DELIVER |
| IN_PROGRESS | NO | NO | DELETE |
| IN_PROGRESS | YES | NO | DELETE |
| IN_PROGRESS | YES | YES | DELIVER |
| IN_PROGRESS | NO | YES | DELETE |

If the event in the event store 202 is marked "NEW_EVENT," and the event is not in the event distribution module 206, then whether or not the client is a durable subscriber, the event 112 is delivered. Thus, all new events will be attempt to be delivered. If the event 112 in the event store 202 is marked "NEW_EVENT," and the event 112 is in the event distribution module 206, then if the client 104 is not a durable subscriber, the event 112 is deleted. If the event in the event store 202 is marked "NEW_EVENT," and the event is in the event distribution module 206, then if the client is a durable subscriber, the event is delivered. Events that are held are only delivered to durable subscribers. If the event in the event store 202 is marked "IN_PROGRESS," and the event is not in the event distribution module 206, then if the client is not a durable subscriber, the event is deleted. If the event in the event store 202 is marked "IN_PROGRESS," and the event is in the event distribution module 206, then if the client is not a durable subscriber, the event is deleted. Events 112 that have been attempted to be delivered are not held unless the client 104 intended to receive that event 112 is a durable subscriber. If the event in the event store 202 is marked "IN_PROGRESS," and the event is in the event distribution module 206, then if the client is a durable subscriber, the event is delivered. If the event in the event store 202 is marked "IN_PROGRESS," and the event is not in the event distribution module 206, then if the client is a durable subscriber, the event is deleted.

The delivery 408 of held events 112 to clients 104 that have become available for the delivery of events is preferably completed before the delivery of any subsequent new event 112 to other clients 104. For example, if there is an event being held for client B, it will stay in that XA data source 114 until such time as Client B comes on line. Clients A and C will receive their event, and any record of that event associated with clients A and C will be removed from the XA data source 114, but the record for Client B remains in the XA data source 114. It also remains in the EIS 102. The adapter apparatus 106 will keep copies around until all clients that were supposed to receive the event have received the event.

When Client B came back online, the held event would go through a recovery cycle in which case Clients A and C would not get any information while the apparatus 106 sent all the information that had been backlogged for Client B, allowing Client B to become in sync with Clients A and C.

The delivery 408 includes confirming for each individual client 104 that the event 112 was delivered to wherever the client 104 may have sent the event 112, such as down-line components. For example in the client A line, the event 112 must get all the way to the endpoint Client A" 122 before the XA transaction commits or completes the delivery of the event 112 for that particular client line. In one embodiment, the transaction service 110 handles the acknowledgment of delivery all the way through a particular client line.

Confirming 410 includes confirming whether or not the event 112 was delivered to the at least one client 104. In one embodiment, the method 400 includes confirming 410 that only one instance of the event 112 was delivered to each of the at least one client 104. Confirming 410 event delivery, as discussed above, is accomplished using a transaction service 110.

Removing 412 includes removing the reference 118 in the staging table 116 to a staged event, upon confirmation of completed delivery of the event 112 to a particular client 104. Removing 412 also includes removing the reference 118 to an event 112 from the staging table 116 upon consumption of the event 112 by the client 104. The removal and consumption comprise an atomic operation. Removing 412 also includes deleting an event from the EIS 102 in response to references to the event 112 being removed from the staging table 116. For example, when there are no more references 118 in the staging table 116 corresponding to the event 112, the event 112 can be removed from the EIS 102. In one embodiment, a staging table 116 devoid of any references 118 to a particular event 112 is confirmation that all intended clients 104 have received the event 112.

The method may be carried out by a computer program product. In one embodiment, a computer program product includes or tangibly embodies a computer readable medium having computer usable program code for facilitating communication between an EIS and one or more clients. The computer program product includes computer usable program code to implement the method described above. The method and corresponding program code may also include the steps necessary to carry out the function of the modules described above and processes described in connection with FIGS. 5 and 6 below.

Figure 5:
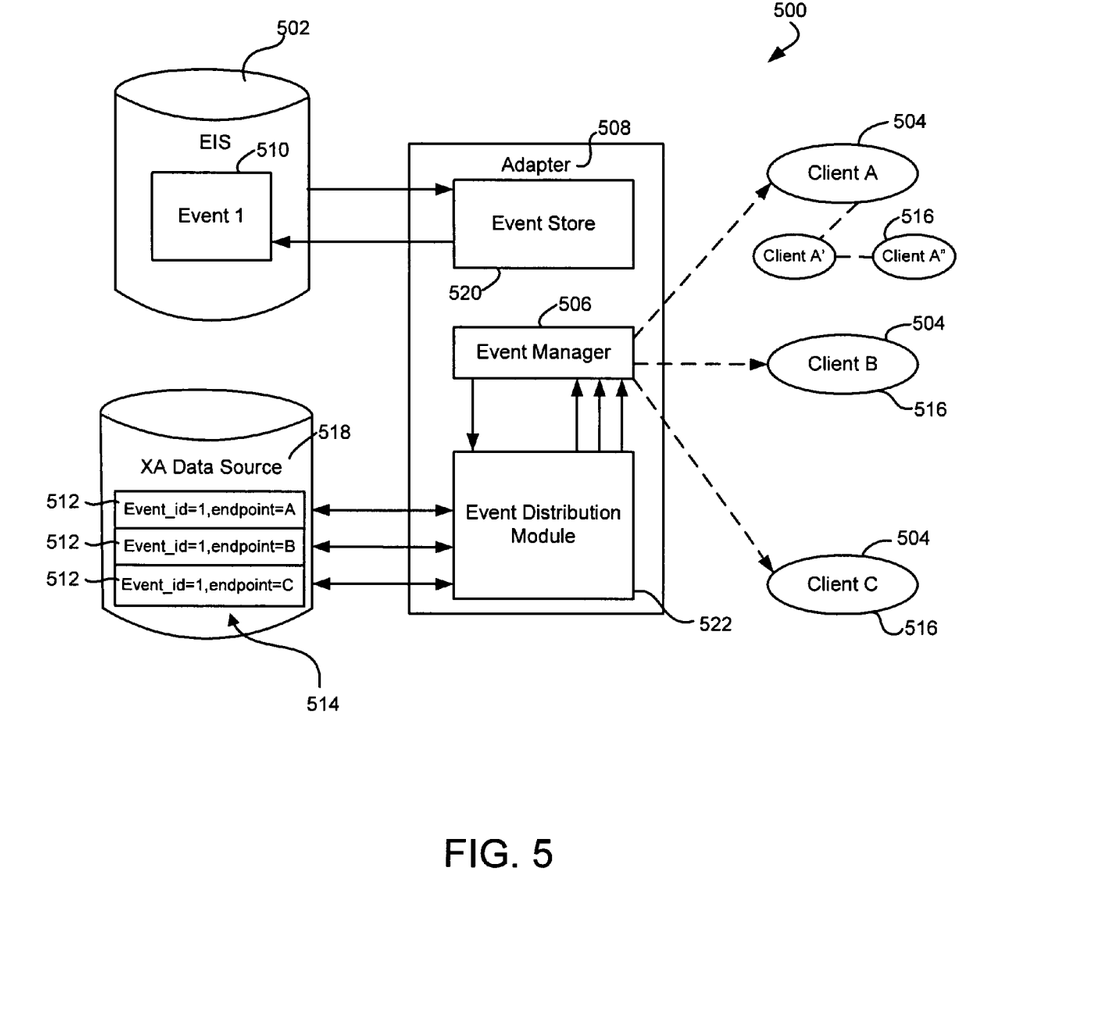
FIG. 5 is a schematic block diagram illustrating one embodiment of a system for facilitating communication between an EIS and a client in accordance with the present invention.

FIG. 5 illustrates a process 500 for facilitating communication between an EIS 502 and clients 504. An event manager 506, as part of an adapter 508 retrieves an event 510. A record or reference 512 is added to a staging table 514 for each active endpoint 516. An event store 520 acts as an interface between the adapter 508 and the EIS 502 and allows the event manager 506 to query and modify events in the EIS 506. An event distribution module 522 provides the event manager 506 with generic access to the staging table 514, which is part of an XA data source 518.

The event 510 is marked as in-progress. Using the staging table 514 as a guide for which events 510 to deliver to which clients 504, the event 510 is published to all active clients 504. Consumption by a client 504 of an individual copy of the event 502 as well as deletion of the same individual event record 512 from the staging table 514 are both performed as part of a single XA transaction.

Once all endpoints 516 have received the event 510, the original event 510 is deleted from the EIS 502. The event manager 506 can identify that the event 510 has been delivered to the endpoints 516 because there are no more references 512 to that particular event 510 in the staging table 514. The process 500 is repeated for each event 112 recorded in the EIS 502.

Figure 6:
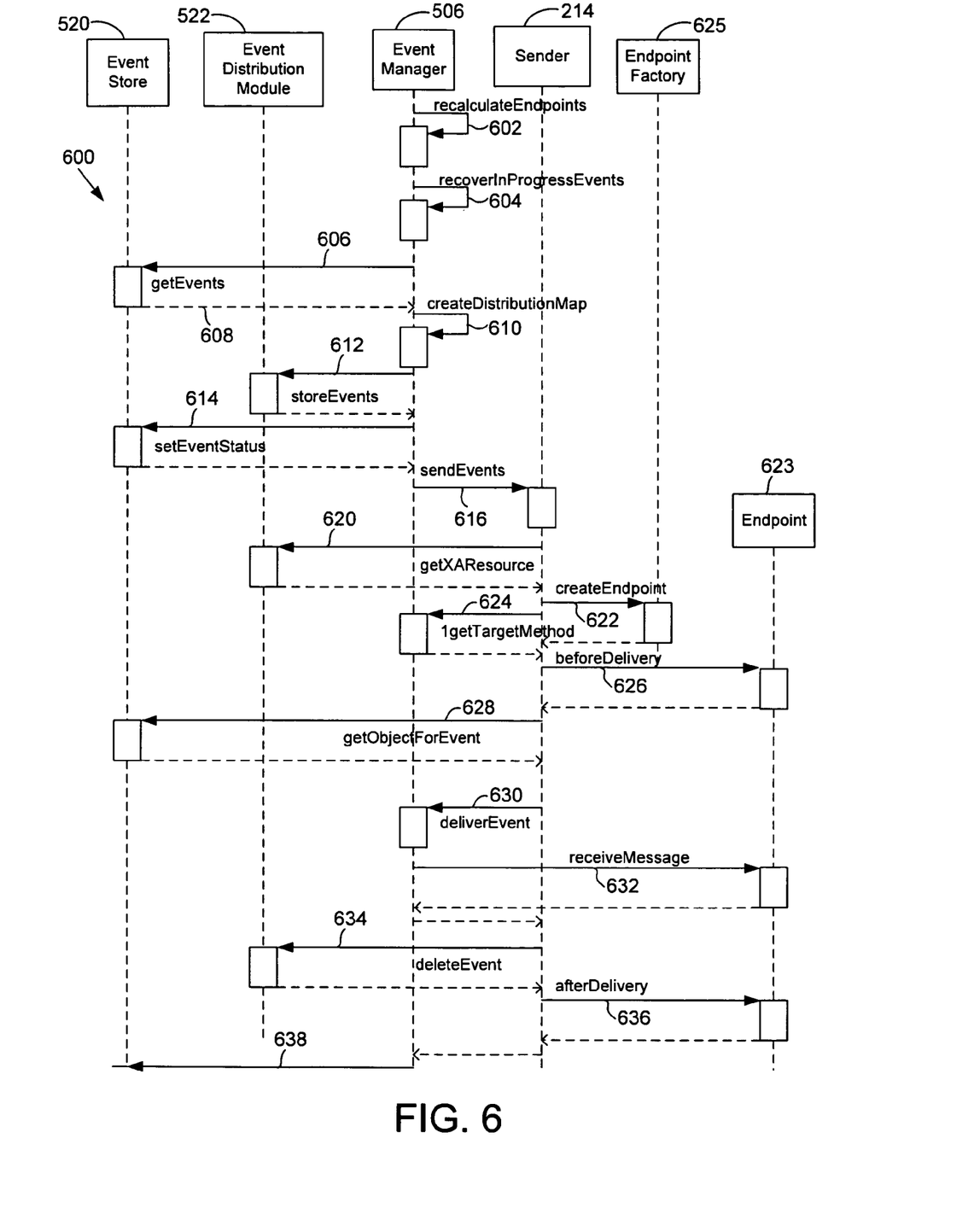
FIG. 6 is a schematic sequence diagram illustrating one embodiment of a method for facilitating communication between an EIS and a client in accordance with the present invention.

FIG. 6 is sequence diagram of the process flow illustrated in FIG. 5. In one embodiment, the first step in the process 600 is to recalculate endpoints 602. The event manager 506 determines if there are any new clients 504 that have come back online since the last poll cycle. A poll cycle is a time period during which the event manager 506 is polling the EIS 502 or event store 520. If there are new clients 504, the event manager 506 determines whether to deliver held events or start new deliveries.

Next the event manager 506 recovers "in-progress events" 604. If there were any new clients 504 that were added since the last poll cycle, the event manager 506 delivers any events that the new clients 504 are missing, thus maintaining the sequence of event delivery. Next, the event manager 506 retrieves new events 606 from the event store 520. The event store 520 returns 608 a list of the new events.

The event manager 506 creates 610 a distribution map. The distribution map defines which events are going to which clients 504. The distribution maps map client identifiers or endpoint identification 121 to the list of events. The event manager 506 defines the event reference 118, 512 that is stored 612 using the event distribution module 522. The event status 207 is set 614 and the events get marked as "IN_PROGRESS" in the EIS 502.

Next, the event manager 506 communicates with sender 214 to begin sending 616 the events 510. Sender 214 sends the events 510. The sender 214 retrieves 620 an XA resource from the event distribution module 522 that is configured to operate according to the XA communication protocol. The sender 214 then calls a J2EE container 108 to create 622 an end point object 623 using an endpoint factory 625. The endpoint object 623 allows the event manager 506 to have access to the client 504 or endpoint 516. The sender 214 retrieves 624 a "target method." When the event manager 506 wants to put something into a transaction, the event manager 506 gives the container 108 a target method and a XA resource. Then, the sender 214 calls 626 a "beforeDelivery" command on the desired endpoint object 623, which tells the container 108 to begin a transaction. Next, the sender 214 retrieves 628 an object 510 for the event. Then the event object 510 is delivered 630 and the event manager 506 is notified. The sender 214 then sends the event 510 to the endpoint 516 via a predetermined function call, in this case "receiveMessage" 632.

The event reference 118,512 is then deleted 634 and the one reference 118,512 for that particular client 504 that the event was delivered to is removed from the staging table 514 by the event distribution module 522. An "After Delivery" command is then executed 636 on the endpoint 516 that tells the container 108 that the event manager is finished with this transaction. At that point the event 510 is handled by the client's business process and then the transaction is committed. The final step is to delete 638 the event 510 from the EIS 502.

Steps 620 through 636 are repeated for each event 510, for each online message endpoint 516. This can occur in one thread per endpoint factory 625 (sequential) or one thread per event, per endpoint factory 625 (unordered).

Utilization of the process taught by the present invention assures clients once-and-only-once delivery of events since consumption of the event by the client and deletion of the event from the staging table is preferably done as part of a single transaction. Alternatively, consumption and delivery may comprise one atomic transaction and deletion of the reference and event may comprise a second atomic transaction. This approach is possible even if the underlying EIS 102 does not support transactions since the transaction spans the client and the staging table, which is XA-enabled, rather than the EIS event table which may not be XA-enabled. Additionally, no endpoint of a client will interfere with the processing of events by any other. Each client receives the event in its own database connection with its own, isolated transaction. If a client 104 or the adapter 106 terminates unexpectedly before all endpoints can receive the event, the staging table 116 maintains a list of which events 112 have not yet been delivered so that the adapter 106 can re-attempt delivery at a later point.

Under the teachings of the present invention, clients 104 can be added and removed dynamically since triggers that detect events 112 within the EIS 102 need not be concerned with clients 102—they simply write a copy of the event to the event distribution module 206. Additionally, polling performance is improved since multiple copies of the event need not be stored in the distribution module 206. The adapter 106 does write multiple records 118 to the staging table 116, but these are merely references 118 to the event 112 managed by the event distribution module 206 and do not contain nearly as much data. Another advantage of the present invention is that it provides a mechanism for having delivery of data from an EIS 102 as part of a two-phase transaction (XA) even when the EIS 102 system may not support XA.

Figure 7:
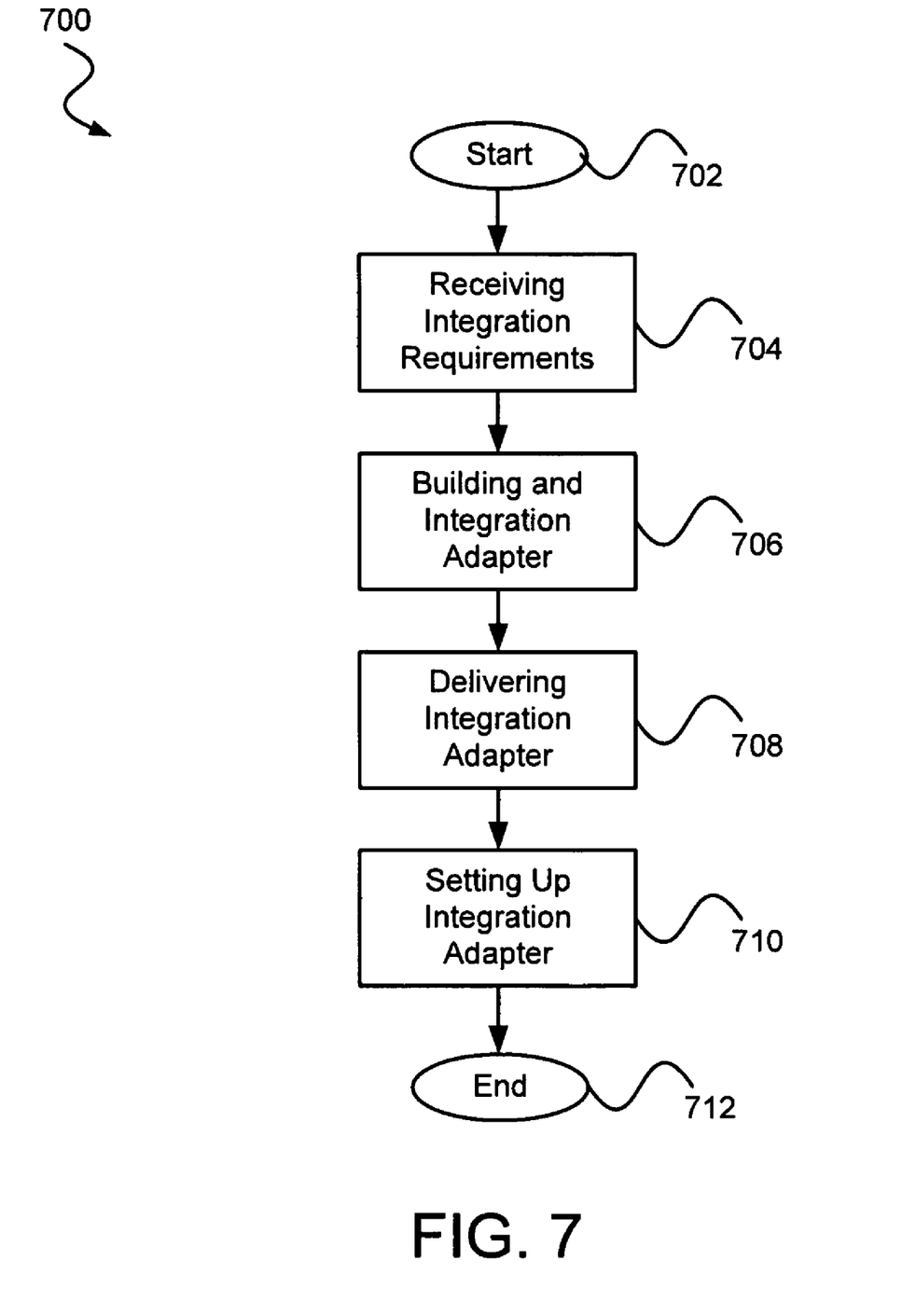
FIG. 7 is a schematic flow chart diagram illustrating one embodiment of an EIS integration method in accordance with the present invention.

FIG. 7 illustrates a method 700 to integrate an EIS with a plurality of software clients for a customer according to the present invention. The method 700 may be practiced by a developer or consulting group. In one embodiment, the method 700 starts 702 and receives 704 a set of integration requirements defining how the EIS 102 is to operate with clients. The method 700 then builds 706 an integration adapter configured to connect an EIS 102 and a plurality of software clients 104 such that the software clients receive EIS events 112. The EIS 102 and/or one or more software clients 104 may belong to a customer. The integration adapter 508 is configured to poll at least one EIS 102 for an event, stage the event for delivery to at least one client, deliver the event to the at least one client, and confirm that only one instance of the event is delivered to each of the at least one clients. The integration adapter 508 is then delivered 708 to the customer. The integration adapter 508 may be optionally set up 710 or installed and the process 700 ends 712.

In one embodiment, setting up 710 the integration adapter includes registering each client to receive events from the EIS 102. It may also include determining the frequency of polling the at least one EIS 102 for an event and the quantity of events to stage before delivery. The method 700 may also include integrating a transaction service with the integration adapter and determining whether events are to be held for an unavailable client until the client becomes available.

Figure 8:
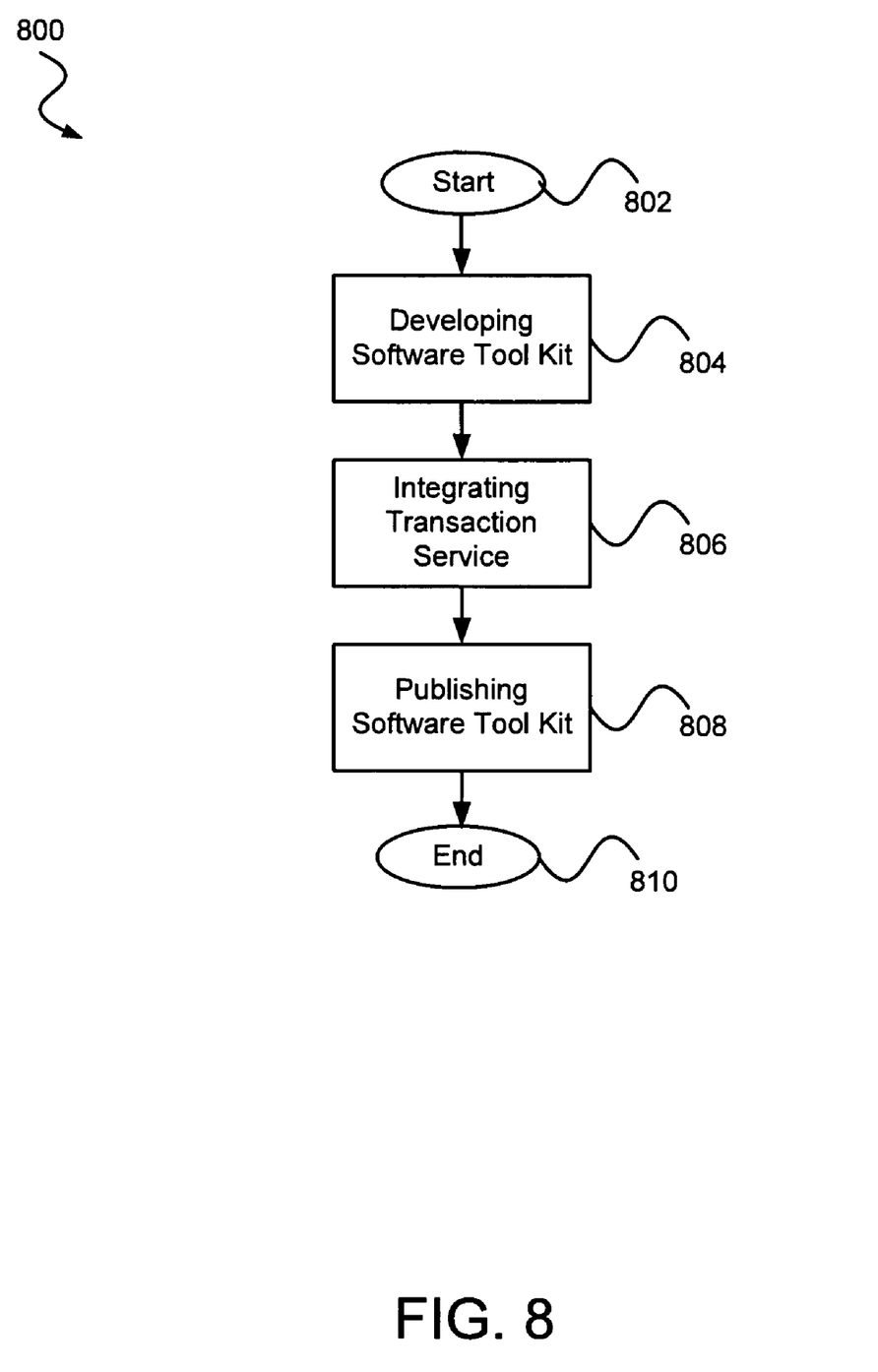
FIG. 8 is a schematic flow chart diagram illustrating one embodiment of a method for deploying a computing infrastructure in accordance with the present invention.

FIG. 8 illustrates a method 800 for deploying computing infrastructure configured to integrate an Enterprise Information System (EIS) with a plurality of software clients that assures once-and-only-once event delivery to the clients. The method starts 802 and a software toolkit is developed 804 that includes a plurality of extendable modules. The modules are configured to poll at least one EIS 102 for an event, stage the event for delivery to at least one client, deliver the event to the at least one client, and confirm that only one instance of the event is delivered to each of the at least one clients. A transaction service is preferably integrated 806 with the software tool kit. The software tool kit may optionally be published 808 or made publicly available through various means and the process ends 810. In one embodiment, the transaction service supports distributed transactions under an XA specification.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer program product comprising a computer readable storage medium storing computer usable program code that when executed by a processor performs a method which facilitates communication between an Enterprise Information System (EIS) and a client, the method including:
   polling an EIS for an event;
   staging the event for delivery to a plurality of clients by writing a reference to the event, for each of the plurality of clients registered to receive events, to a staging table;
   delivering the event to the plurality of clients; and
   certifying that only one instance of the event was received by the plurality of clients by removing a particular reference to the event for a particular client from the staging table upon a consumption of the event by the particular client of the plurality of clients, the removal of the particular reference and the consumption of the event by the particular client comprising an atomic operation spanning the staging table and the particular client, the atomic operation using a transaction service according to an Open Group distributed transaction (XA) specification.

2. The computer program product of claim 1, wherein polling the EIS comprises determining whether clients are available to receive events.

3. The computer program product of claim 1, wherein polling the EIS comprises periodically querying the EIS for new events based on a user-configured parameter.

4. The computer program product of claim 1, wherein staging the event further comprises marking a delivery status for each event within the EIS.

5. The computer program product of claim 1, wherein the staging table comprises an XA compliant staging table.

6. The computer program product of claim 1, further comprising removing the reference in the staging table to a staged event, upon confirmation of completed delivery of the event to a particular client.

7. The computer program product of claim 1, further comprising deleting an event from the EIS in response to references to the event being removed from the staging table as an atomic operation.

8. The computer program product of claim 1, wherein delivering the event further comprises transmitting and storing the event using a transaction service.

9. The computer program product of claim 1, further comprising holding a first event for clients that are unavailable.

10. The computer program product of claim 9, wherein holding the first event for the unavailable clients is user-configurable.

11. The computer program product of claim 9, wherein delivering the event further comprises delivering one or more held events to a first client that becomes available, in response to an indicator obtained during polling that the first client has become available.

12. The computer program product of claim 11, wherein the delivery of the one or more held events to the first client that has become available for the delivery of events is completed before the delivery of new events to other clients.

13. The computer program product of claim 1, further comprising deleting the event from the EIS upon confirmation that all clients registered to receive the event have received the event.

14. A computer implemented method to integrate an Enterprise Information System (EIS) with a plurality of software clients for a customer, the method implemented by way of a processor and a memory, the method comprising:
receiving a set of integration requirements;
building an integration adapter configured to connect an EIS and a plurality of clients such that the client plurality of clients receives EIS events, the integration adapter configured to,
poll the EIS for an event;
stage the event for delivery to the plurality of clients by writing a reference to the event, for each of the plurality of clients registered to receive events, to a staging table;
deliver the event to the plurality of clients; and
certify that only one instance of the event is received by each of the plurality of clients by removing a particular reference to the event for a particular client from the staging table upon a consumption of the event by the particular client of the plurality of clients, the removal of the particular reference and the consumption of the event by the particular client comprising an atomic operation spanning the staging table and the particular client, the atomic operation using a transaction service according to an XA specification; and
delivering the integration adapter to the customer.

15. The method of claim 14, comprising registering each of the at least one client to receive events from the EIS.

16. The method of claim 14, comprising determining the frequency of polling the EIS for an event.

17. The method of claim 14, comprising determining a quantity of events to stage before delivery.

18. The method of claim 14, further comprising integrating a transaction service with the integration adapter.

19. The method of claim 14, comprising determining whether events are to be held for an unavailable client until the client becomes available.

20. A computer implemented method to facilitate communication between an Enterprise Information System (EIS) and a client, the method comprising:
polling an EIS for an event;
staging the event for delivery to a plurality of clients by writing a reference to the event, for each of the plurality of clients registered to receive events, to a staging table;
delivering the event to the plurality of clients;
certifying that only one instance of the event was received by each of the plurality of clients by removing a particular reference to the event for a particular client from the staging table upon a consumption of the event by the particular client of the plurality of clients, the removal of the particular reference and the consumption of the event by the particular client comprising an atomic operation spanning the staging table and the particular client, the atomic operation using a transaction service according to an XA specification; and
determining a delivery status of the event for each of the plurality of clients.

21. The method of claim 20, wherein the staging table comprises an XA compliant staging table.

22. The method of claim 20, further comprising removing the reference in the staging table to a staged event, upon confirmation of completed delivery of the event to the particular client.

23. The method of claim 20, wherein staging the event further comprises marking a delivery status for each event within the EIS.

24. The method of claim 20, wherein delivering the event further comprises temporarily holding events for clients that are unavailable.

25. The method of claim 24, wherein delivering the event further comprises delivering one or more held events to a client that becomes available, in response to an indicator produced during polling.

26. The method of claim 20, wherein delivering the event comprises sending events to clients designated as durable subscribers.

27. The method of claim 20, further comprising deleting the event from the EIS upon confirmation that all intended clients have received the event.

28. An apparatus to facilitate communication between an Enterprise Information System (EIS) and a client, the apparatus comprising:
a polling module configured to poll an EIS for an event, the polling module stored on a memory and executed with a processor;
a staging module configured to stage the event for delivery to a plurality of clients by writing a reference to the event, for each of the plurality of clients registered to receive events, to a staging table;
a delivery module configured to deliver the event to the plurality of clients;
a confirmation module configured to certify that only one instance of the event is received by each of the plurality of clients;
a removal module configured to remove a particular reference to the event for a particular client from the staging table upon a consumption of the event by the particular client of the plurality of clients, the removal of the particular reference and the consumption of the event by the particular client comprising an atomic operation spanning the staging table and the particular client, the atomic operation using a transaction service according to an XA specification; and
the staging module further configured to determine a delivery status of the event for each of the plurality of clients.

29. The apparatus of claim 28, wherein the polling module is configured to periodically query the EIS for new events based on a user-configured parameter.

30. The apparatus of claim 28, wherein the staging table comprises an XA compliant staging table.

31. The apparatus of claim 28, wherein the removal module is further configured to remove the particular reference to a staged event from the staging table, upon confirmation of completed delivery of the event corresponding to the particular reference to the particular client.

32. The apparatus of claim 28, wherein the staging module is further configured to mark a delivery status for each event.

33. A computer implemented method for deploying computing infrastructure configured to integrate an Enterprise Information System (EIS) with a plurality of software clients that assures once-and-only-once event delivery to the clients, the method implemented by way of a processor and a memory, the method comprising:

developing a software toolkit comprising a plurality of extendable modules, the modules configured to,
poll an EIS for an event
stage the event for delivery to a plurality of client by writing a reference to the event to a staging table;
deliver the event to the at least one plurality of clients; and
certify that only one instance of the event is delivered to each of the plurality of clients by removing a particular reference to the event for a particular client from the staging table upon a consumption of the event by the particular client of the plurality of clients, the removal of the particular reference and the consumption of the event by the particular client comprising an atomic operation spanning the staging table and the particular client, the atomic operation using a transaction service according to an XA specification;
determining a delivery status of the event for each of the plurality of clients;
integrating the transaction service with the software tool kit; and
publishing the software tool kit.

34. The method of claim 33, wherein the transaction service supports distributed transactions supported by the XA specification.

* * * * *